Figure 1:
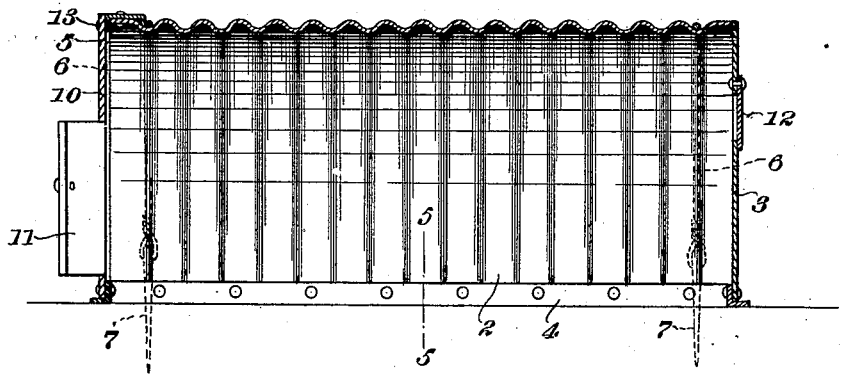

C. J. BEAR.
ANIMAL SHELTER.
APPLICATION FILED SEPT. 17, 1910.

988,241.

Patented Mar. 28, 1911.

Witnesses

Inventor
Carlton J. Bear,
By
Attorneys

UNITED STATES PATENT OFFICE.

CARLTON J. BEAR, OF MONTICELLO, ILLINOIS.

ANIMAL-SHELTER.

988,241.  Specification of Letters Patent.  Patented Mar. 28, 1911.

Original application filed February 18, 1910, Serial No. 544,596. Divided and this application filed September 17, 1910. Serial No. 582,572.

*To all whom it may concern:*

Be it known that I, CARLTON J. BEAR, a citizen of the United States, residing at Monticello, in the county of Piatt and State of Illinois, have invented new and useful Improvements in Animal-Shelters, of which the following is a specification.

The present invention relates to farrowing pens, and is designed particularly for use with breeding sows, although it will be understood that it may be used as shelter for other small live stock such as sheep and goats, and, furthermore, if desired, it may be utilized as a shelter for poultry, to which use it is well adapted.

It is designed particularly for use in fields which may, in some instances, be far distant from the farm buildings, and where it is extremely desirable that temporary shelter be given to the litters.

It contemplates the provision of a shelter which will be weatherproof, which may be readily moved from place to place, which will be strong enough to withstand the ordinary service and uses to which these shelters are put, and, furthermore, which will be durable and which can be produced at a very cheap initial cost, and so far as repairs are concerned may be maintained at nominal expense.

The present application is a division of an application forming the subject matter of patent granted to me September 20, 1910, No. 970,873, the present application being more particularly drawn to the structure of animal shelter having its ends closed and provided with means for the ingress and egress of the animals, and for ventilating the interior of the shelter.

To these and other ends, the nature of which will be readily understood as the invention is hereinafter disclosed, said invention consists in the improved construction and combination of parts, hereinafter fully described, illustrated in the accompanying drawings, and fully pointed out in the appended claim.

In the drawings which accompany and form a part of this specification I have illustrated one embodiment of my invention, and in said drawings—

Figure 2:
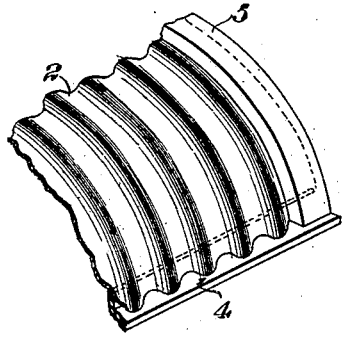
Figure 3:
Figure 6:
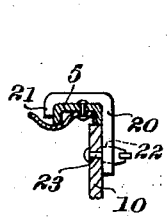
Figure 4:
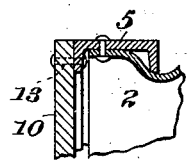
Figure 5:
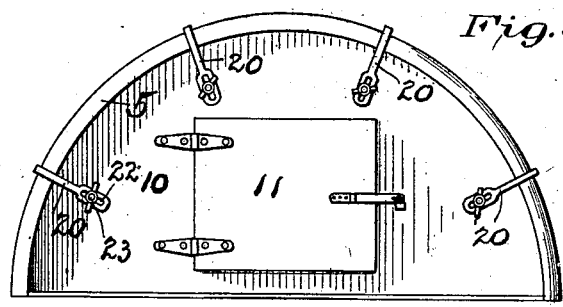

Figure 1 is a longitudinal vertical section of a pen made in accordance with my invention; Fig. 2 is a detail view, illustrating the frame structure of the pen; Fig. 3 is a detail sectional view on line 5—5 of Fig. 1; Fig. 4 is a detail showing the manner of attaching the front to the shelter proper; Fig. 5 is a front elevation of a pen showing a slightly modified form of holding means; Fig. 6 is a fragmentary cross-sectional view of the connection shown in Fig. 5.

Referring to the drawings by numerals, like numbers indicating like parts in the several views, 2 denotes the body portion of the shelter, which is preferably made of light corrugated metal bent into the dome-like form shown, one end of this dome-like body portion being closed by a suitable back 3 as clearly shown in the longitudinal section, Fig. 1. The sheet metal portion just described rests upon, and is secured by rivets or in any other manner, to a sill frame 4 of L-shaped angle iron of light gage, but sufficiently heavy to give a good stiff base for the sheet metal shelter; this angle iron frame may be of rectangular form, as shown in Fig. 1, and one limb of the rectangular frame may extend across the open front so as to give great rigidity to the structure. The shelter thus formed is light, but rigid, and in order that the curved front of the dome-shaped portion may be further stiffened I provide it with an arc-shaped stiffening rib 5, of channel iron so that, as shown in Figs. 1 and 2, it may be placed over the raw edge of the dome 2 at the front thereof, and secured by suitable rivets, thus stiffening the entire structure and protecting the raw or sharp edge of the dome 2. At the ends this arc-shaped stiffening rib 5 may be secured to the frame 4, on which the dome 2 rests, all as shown in Figs. 2 and 3, so that a relatively rigid structure is provided.

The structure is, of course, light, and in order that it may not be displaced or overturned by high winds I preferably provide pins for securing it in place in the fields, such means being a guy wire 6 which is secured at either end to stakes of any suitable material, and which when in use is laid across the dome-shaped body portion 2 of the shelter preferably at the front and rear ends thereof, the wire lying in the corrugations and the stakes 7 being driven down on either side, preferably close to the shelter, until the wire 6 is drawn tightly across the dome 2 and the shelter pinned securely to the ground. It will be seen that by providing the corrugated dome surface, an effective locking seat for the wires is formed and slip of the wires longitudinally of the dome prevented, so that displacement of the shelter by animals or by high winds and its release from the securing wires are practically impossible.

I have heretofore stated that the shelter may, if desired, be provided with a front, and provision may also be made for ventilation; for this purpose a wooden front 10 is provided which is secured in place in the front aperture of the shelter, this front 10 being snugly fitted to the dome stiffening arch 5 and resting at its base on the base flange of the bottom frame, and its top being secured by suitable pins 13 which pass through apertures in a flange of the arch 5 into the edges of the front 10 and hold it securely in place. Said front 10 is preferably provided with a door 11, which, as shown in the present case, is a swinging door, although obviously it may be of any type desired. In order that the shelter, when provided with a front, may be properly ventilated, I preferably provide this form with a swinging ventilator 12 in the rear wall, this ventilator controlling an opening therein, so as to admit more or less air.

The front 10 may be secured in position by any suitable means, the simplest design being to make use of pins 13; obviously, other forms of connection may be employed, such, for instance, as the clips 20 carried by the front 10, and having the hooked end 21 adapted to extend over the stiffening rib 5, as shown in Figs. 5 and 6, the clips being provided with an opening 22 through which a pin or bolt 23 is adapted to extend and secure the clip to the front 10.

The shelter which I have invented is cheap to construct, light to handle, and absolutely weatherproof in use, and it will be seen that it may be nested in numbers for shipment and storing so as to occupy but little room.

Obviously such departures from the present disclosure as amount to mechanical deviations only, may be made without departing from the spirit of my invention, and for that reason I do not restrict myself to the details of construction shown and described.

What I claim is:—

An animal shelter comprising a sill-frame formed of angle-iron L-shaped in cross-section, a corrugated sheet metal dome, the lower edges of which are riveted to the outer side of the vertical flanges of said sill-frame, a dome stiffening and edge protecting arch of channel-iron springing from the sill-frame and overhanging and inclosing the raw edge of said dome at the front thereof, said channel-iron being secured to both the sill-frame and the dome, and a front wall fitted to said shelter and secured to the face of the overhanging flange of said channel-iron arch.

In testimony whereof I have hereunto set my hand in presence of two subscribing witnesses.

CARLTON J. BEAR.

Witnesses:
 FRANK HETISHEE,
 GEORGE B. NOUKER.

---

Copies of this patent may be obtained for five cents each, by addressing the "Commissioner of Patents, Washington, D. C."